(12) United States Patent
Tang (10) Patent No.: US 10,173,861 B2
(45) Date of Patent: Jan. 8, 2019

(54) HANDWRITING INPUT FOR ELEVATOR DESTINATION FLOOR INPUT (71) Applicant: OTIS ELEVATOR COMPANY, Farmington, CT (US)

(72) Inventor: Xiaobin Tang, Tianjin (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 449 days.

(21) Appl. No.: 14/892,689

(22) PCT Filed: May 24, 2013

(86) PCT No.: PCT/CN2013/076199
§ 371 (c)(1),
(2) Date: Nov. 20, 2015

(87) PCT Pub. No.: WO2014/186976
PCT Pub. Date: Nov. 27, 2014

(65) Prior Publication Data
US 2016/0096706 A1 Apr. 7, 2016

(51) Int. Cl.
B66B 1/20 (2006.01)
B66B 1/14 (2006.01)
(Continued)

(52) U.S. Cl.
CPC .............. *B66B 1/14* (2013.01); *B66B 1/3446* (2013.01); *B66B 1/463* (2013.01); *B66B 1/468* (2013.01);
(Continued)

(58) Field of Classification Search
CPC ......... B66B 1/14; B66B 1/3446; B66B 1/463; B66B 1/468; B66B 2201/463;
(Continued)

(56) References Cited

U.S. PATENT DOCUMENTS 5,679,934 A * 10/1997 Juntunen ................. B66B 1/462
187/384
6,105,729 A * 8/2000 Nakamori ............... B66B 1/462
187/391
(Continued)

FOREIGN PATENT DOCUMENTS

CN 1129667 A 8/1996
CN 201411288 Y 2/2010
(Continued)

OTHER PUBLICATIONS

Translation JP 2004-277119 A.*
(Continued)

*Primary Examiner* — Anthony Salata
(74) *Attorney, Agent, or Firm* — Cantor Colburn LLP (57) ABSTRACT A method includes receiving, by a computing device including a processor, a handwriting input including a selection of a destination floor associated with an elevator system, determining, by the computing device, that the handwriting input selection is recognizable, presenting, by the computing device, a message that requests confirmation that the input selection is interpreted correctly based on determining that the handwriting input selection is recognizable, receiving, by the computing device, a response to the message that confirms the input selection, and causing, by the computing device, the elevator system to provide access to the destination floor based on the response.

15 Claims, 6 Drawing Sheets (51) Int. Cl.
- *B66B 1/46* (2006.01)
- *B66B 1/34* (2006.01)
- *G06F 3/0482* (2013.01)
- *G06F 3/0484* (2013.01)
- *G06F 3/0488* (2013.01)
- *G06K 9/00* (2006.01)

(52) U.S. Cl.
CPC ........ *G06F 3/0482* (2013.01); *G06F 3/04842* (2013.01); *G06F 3/04883* (2013.01); *G06K 9/00436* (2013.01); *B66B 2201/463* (2013.01); *B66B 2201/4676* (2013.01)

(58) Field of Classification Search
CPC ........... B66B 2201/4676; G06F 3/0482; G06F 3/04842; G06F 3/04883; G06K 9/00436
USPC ................ 187/247, 380–388, 391–393, 396; 713/182, 186
See application file for complete search history.

(56) References Cited

U.S. PATENT DOCUMENTS

| | | | | |
|---|---|---|---|---|
| 7,609,862 B2* | 10/2009 | Black | ................... | G06K 9/0002 382/124 |
| 7,620,817 B2* | 11/2009 | Friedli | ................... | B66B 1/468 116/64 |
| 7,766,129 B2* | 8/2010 | Makela | ................... | B66B 1/20 187/382 |
| 7,877,707 B2* | 1/2011 | Westerman | ......... | G06F 3/04883 715/863 |
| 7,936,249 B2* | 5/2011 | Friedli | ................... | B66B 1/468 340/5.5 |
| 8,151,942 B2* | 4/2012 | Rusanen | ................ | B66B 1/468 187/247 |
| 8,763,762 B2* | 7/2014 | Finschi | ................... | B66B 1/468 187/391 |
| 9,045,314 B2* | 6/2015 | Finschi | ................... | B66B 1/467 |
| 9,079,749 B2* | 7/2015 | Hsieh | ...................... | B66B 3/002 |
| 9,561,931 B2* | 2/2017 | Kauppinen | ............. | B66B 1/468 |
| 9,718,641 B2* | 8/2017 | Finschi | ................. | B66B 1/3423 |
| 2006/0259777 A1* | 11/2006 | Izawa | ..................... | B66B 1/468 713/186 |
| 2012/0014601 A1 | 1/2012 | Jiang et al. | | |
| 2017/0144859 A1* | 5/2017 | Scoville | ................... | G06F 3/017 |

FOREIGN PATENT DOCUMENTS

| | | | |
|---|---|---|---|
| CN | 201494975 U | | 6/2010 |
| CN | 202130942 U | | 2/2012 |
| EP | 2159183 A1 | | 3/2010 |
| JP | H10167596 A | | 6/1998 |
| JP | 2004277119 A | * | 10/2004 |
| JP | 2007238232 A | | 9/2007 |

OTHER PUBLICATIONS

European Search Report for application EP 13885161.3, dated Dec. 19, 2016, 7 pages.
International Search Report for application PCT/CN2013/06199 dated Feb. 27, 2014, 11 pages.
Kaplan, Melanie, D.G., "Intelligent elevators answer vertical challenges", SmartPlanet, available at http://www.zdnet.com/article/intelligent-elevators-answer-vertical-challenges/, Jul. 17, 2012, 5 pages.
Written Opinion for application PCT/CN2013/06199 dated Feb. 27, 2014, 5 pages.
Chinese Office Action and Search for application CN 201380076857.5, dated Oct. 9, 2016, 16 pages.

* cited by examiner

HANDWRITING INPUT FOR ELEVATOR DESTINATION FLOOR INPUT

BACKGROUND

Figure 1A:
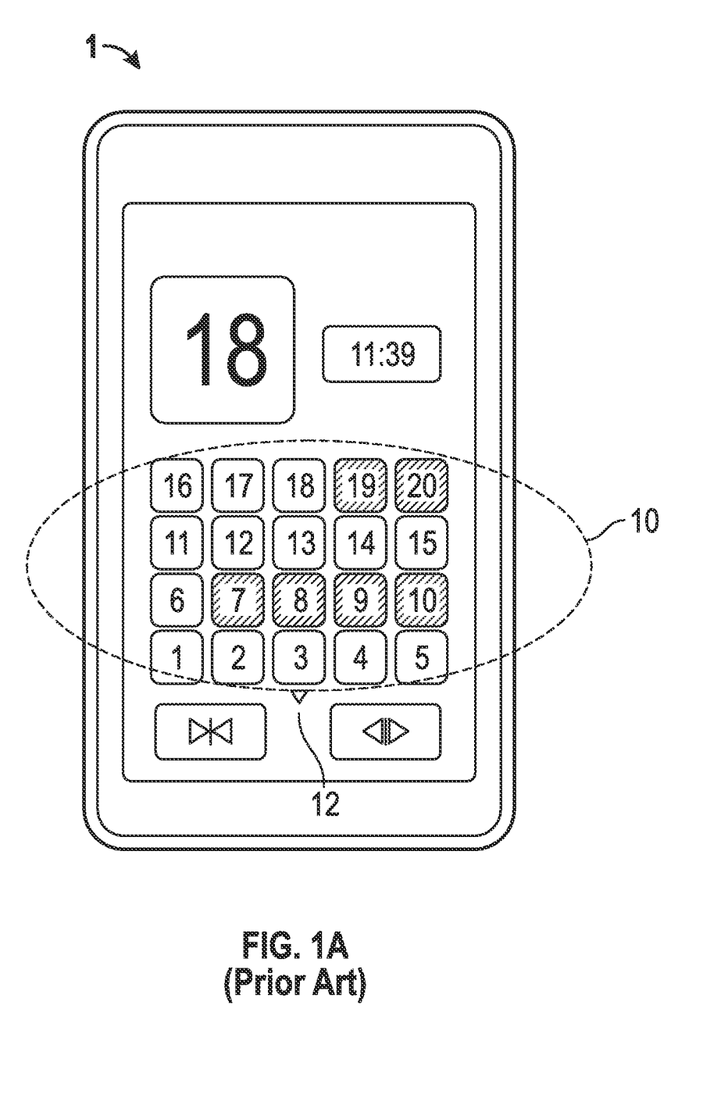
FIG. 1A is a touch screen in accordance with the prior art.

A passenger of an elevator system may request elevator service using a touch screen. The touch screen may need to support all the floors that are accessible to passengers. For example, if a building in which the elevator is located has sixty floors, the touch screen may be configured to enable a passenger to select any one of the sixty floors. Referring to FIG. 1A, a touch screen 1 is shown. The touch screen may include a number of buttons 10, each of which may correspond to floors of the elevator. As shown in FIG. 1A, the buttons 10 are numbered one through twenty, which may correspond to the first twenty floors of the building. A slide or "next" button 12 may be provided, such that additional floors 10 may be accessible for selection on the touch screen 1 following a depression of the slide button 12. For example, if a passenger presses the slide button 12 while floor numbers one through twenty 10 are displayed as shown in FIG. 1A, following the depression of the slide button 12 a second set of floor numbers (e.g., floor numbers twenty-one through forty) may be displayed. In this manner, a passenger can cycle through all the floors to select a floor of interest using the slide button 12.

In some instances, the touch screen 1 may include buttons 10 for all the floors of the building on a single display screen, in lieu of providing the slide button 12. Thus, if the building has sixty floors, sixty buttons 10 may be included in a single display screen. It may be difficult for a passenger with poor or degraded vision to see the identifiers on each of the sixty buttons 10. Moreover, even assuming that the passenger can see such identifiers, the passenger's fingers may be too large relative to the dimensions of the buttons 10, such that passengers may be prone to depressing an incorrect or unintended button 10.

If secure access is provided by the elevator system to a particular floor, a passenger may be required to correctly input an access credential on one or more input devices (e.g., a hall operation panel or car operation panel). It is often difficult for a passenger to enter such a credential using a touch screen (e.g., touch screen 1).

BRIEF SUMMARY

An embodiment is directed to a method comprising: receiving, by a computing device comprising a processor, a handwriting input comprising a selection of a destination floor associated with an elevator system, determining, by the computing device, that the handwriting input selection is recognizable, presenting, by the computing device, a message that requests confirmation that the input selection is interpreted correctly based on determining that the handwriting input selection is recognizable, receiving, by the computing device, a response to the message that confirms the input selection, and causing, by the computing device, the elevator system to provide access to the destination floor based on the response.

An embodiment is directed to an apparatus comprising: at least one processor, and memory having instructions stored thereon that, when executed by the at least one processor, cause the apparatus to: receive a handwriting input comprising a selection of a destination floor associated with an elevator system, determine that the handwriting input selection is recognizable, present a message that requests confirmation that the input selection is interpreted correctly based on determining that the handwriting input selection is recognizable, receive a response to the message that confirms the input selection, and cause the elevator system to provide access to the destination floor based on the response.

An embodiment is directed to a system comprising: an elevator configured to convey passengers to a plurality of floors within a building, wherein at least one of the floors is a secured floor, and a processing device configured to: receive a handwriting input comprising a selection of a destination floor included in the plurality of floors, determine that the handwriting input selection is recognizable, present a message that requests confirmation that the input selection is interpreted correctly based on determining that the handwriting input selection is recognizable, receive a response to the message that confirms the input selection, determine that the handwriting input selection corresponds to a secured floor based on the received response, request an access credential based on determining that the handwriting input selection corresponds to a secured floor, receive an access credential based on the request for the access credential, determine that the received access credential matches a stored access credential within a threshold, and cause the elevator to provide access to the destination floor based on determining that the received access credential matches the stored access credential within the threshold.

Additional embodiments are described below.

BRIEF DESCRIPTION OF THE DRAWINGS

The present disclosure is illustrated by way of example and not limited in the accompanying figures in which like reference numerals indicate similar elements.

DETAILED DESCRIPTION

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of apparatuses, systems, and methods are described for receiving input on a touch screen associated with an elevator. In some embodiments, the input may correspond to a handwriting that may be used to identify a destination floor or landing of interest. In some embodiments, the input may correspond to an access credential that, when input correctly, may provide access to a secure resource (e.g., a floor or landing of a building).

Figure 1B:
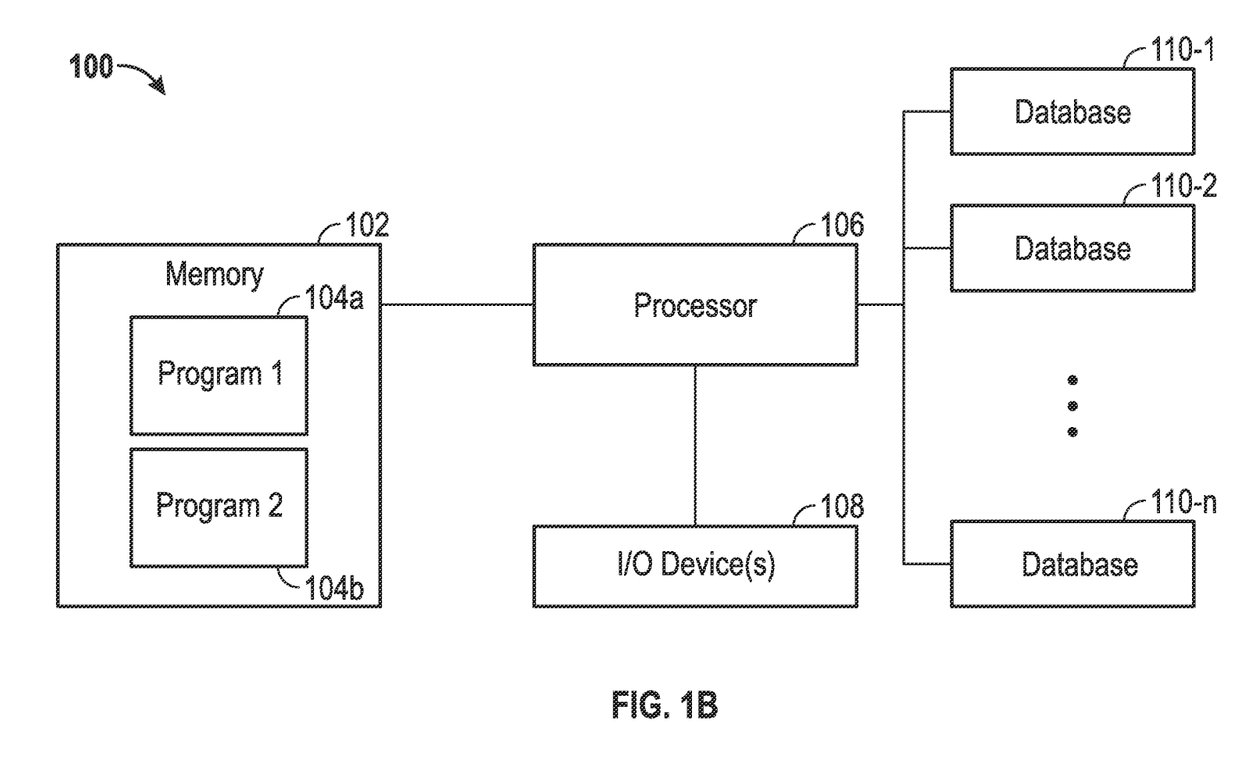
FIG. 1B is a schematic block diagram illustrating an exemplary computing system.

Referring to FIG. 1B, an exemplary computing system 100 is shown. The system 100 is shown as including a memory 102. The memory 102 may store executable instructions. The executable instructions may be stored or organized in any manner and at any level of abstraction, such as in connection with one or more applications, processes, routines, procedures, methods, etc. As an example, at least a portion of the instructions are shown in FIG. 1 as being associated with a first program 104a and a second program 104b.

The instructions stored in the memory 102 may be executed by one or more processors, such as a processor 106. The processor 106 may be coupled to one or more input/output (I/O) devices 108. In some embodiments, the I/O device(s) 108 may include one or more of a keyboard or keypad, a touchscreen or touch panel, a display screen, a microphone, a speaker, a mouse, a button, a remote control, a joystick, a printer, a telephone or mobile device (e.g., a smartphone), etc. The I/O device(s) 108 may be configured to provide an interface to allow a user to interact with the system 100.

As shown, the processor 106 may be coupled to a number 'n' of databases, 110-1, 110-2, . . . 110-n. The databases 110 may be used to store data, such as information that may be used to identify one or more users or persons associated with the system 100. In some embodiments, the data may include variations on one or more inputs (e.g., handwriting) that may be received at a device. In some embodiments, the data may include one or more stored access credentials that may be associated with a secure resource (e.g., a floor or landing of a building). In some embodiments, the stored access credential(s) may be compared to received access credential(s) to determine whether access to a secure resource should be granted.

The system 100 is illustrative. In some embodiments, one or more of the entities may be optional. In some embodiments, additional entities not shown may be included. In some embodiments, the entities may be arranged or organized in a manner different from what is shown in FIG. 1. For example, in some embodiments, the memory 102 may be coupled to or combined with one or more of the databases 110.

Figure 2:
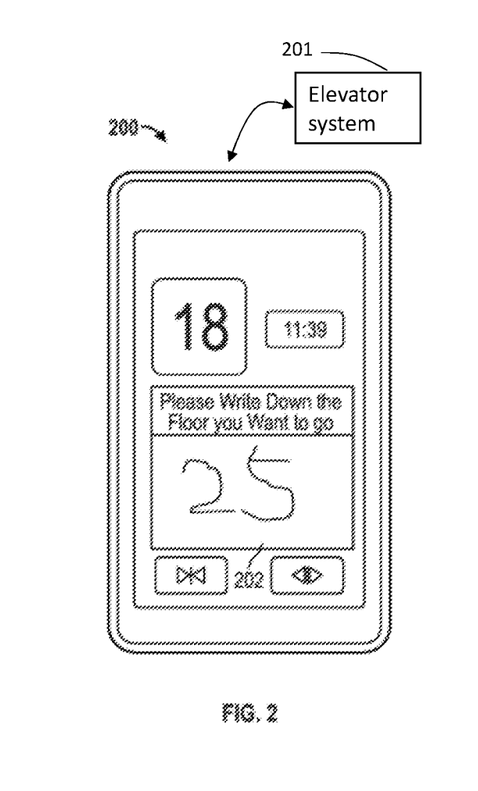
FIG. 2 is an exemplary touch screen for entering a destination floor using handwriting.

Turning now to FIG. 2, a touch screen 200 in accordance with one or more embodiments is shown. The touch screen 200 may be implemented in connection with one or more components or devices, such as those described above in connection with the system 100.

The touch screen 200 may include a handwriting area or region 202 that may be used to receive an input that selects a destination floor for an elevator system 201. In the example of FIG. 2, the passenger has entered '25' in the handwriting area 202, which may correspond to a selection of floor number twenty-five. In some embodiments, the handwriting area 202 may consume more or less of the screen space relative to what is shown in FIG. 2. In other words, FIG. 2 is not necessarily drawn to scale.

In response to receiving the input '25' in the handwriting area 202, a device may process the input to determine which floor the entered input corresponds to. In some embodiments, optical character recognition (OCR) techniques may be used to perform such a determination.

Figure 3:
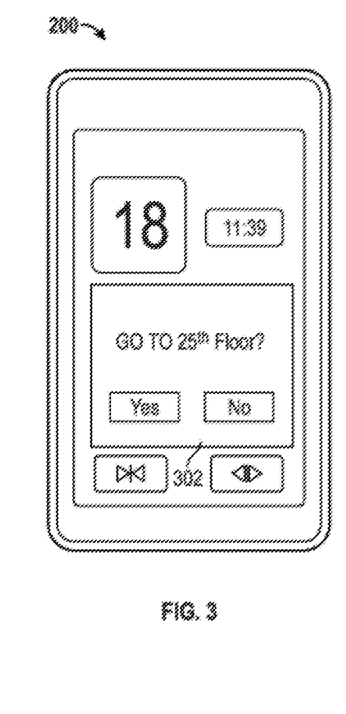
FIG. 3 is an exemplary touch screen for confirming an entered destination floor.

Referring to FIG. 3, in response to the input '25' entered into the handwriting area 202, a message 302 may be provided on the touchscreen 200 to confirm that the handwriting input was interpreted correctly. The passenger may have the option to select 'Yes' or 'No' from the message 302 as shown in FIG. 3.

In some embodiments, the content of the message 302 may take a form different from what is shown in FIG. 3. For example, if the handwriting entered in the handwriting area 202 cannot be recognized a message may be displayed that reads, e.g., "input not recognized, please enter again." In some embodiments, if the passenger enters a floor that, while recognized, is not available in the building (e.g., the passenger enters '89' in the handwriting area 202 in a building that only has sixty floors), the message 302 may display "floor 89 is not available, please enter floor again." Of course, other forms for the content of the message 302 may be used in some embodiments.

Figure 4:
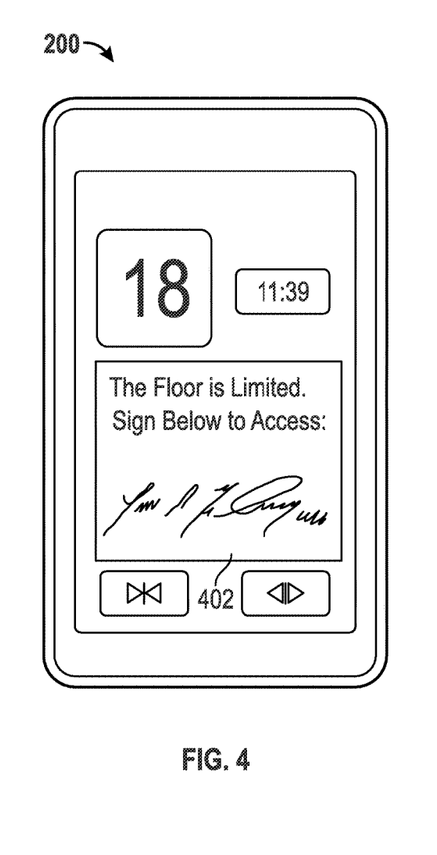
FIG. 4 is an exemplary touch screen for receiving an access credential as a handwritten signature.

Referring now to FIG. 4, in response to the input '25' entered into the handwriting area 202, a message 402 may be provided on the touchscreen 200 to request and receive an access credential. For example, if floor number twenty-five is a secure floor, a passenger may need to enter an access credential to gain access to the floor using the elevator. The access credential may take one or more forms. In FIG. 4, the passenger may apply his/her signature in an area or region of the message 402. Once the passenger enters his/her signature, a comparison may take place between the entered signature and a stored signature to determine if the signature matches within a threshold. If it does, the passenger may be granted access to floor number twenty-five. On the other hand, if the entered signature does not match the stored signature within the threshold, the passenger may be denied access to floor number twenty-five.

Figure 5A:
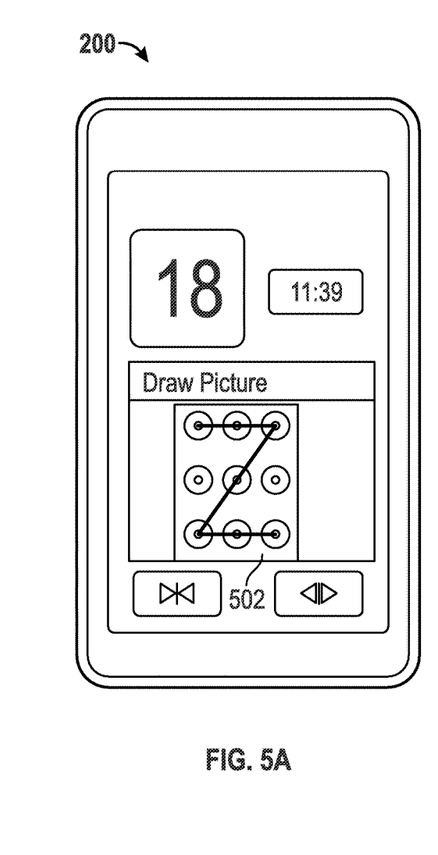
FIG. 5A is an exemplary touch screen for receiving an access credential as a picture or pattern.
Figure 5B:
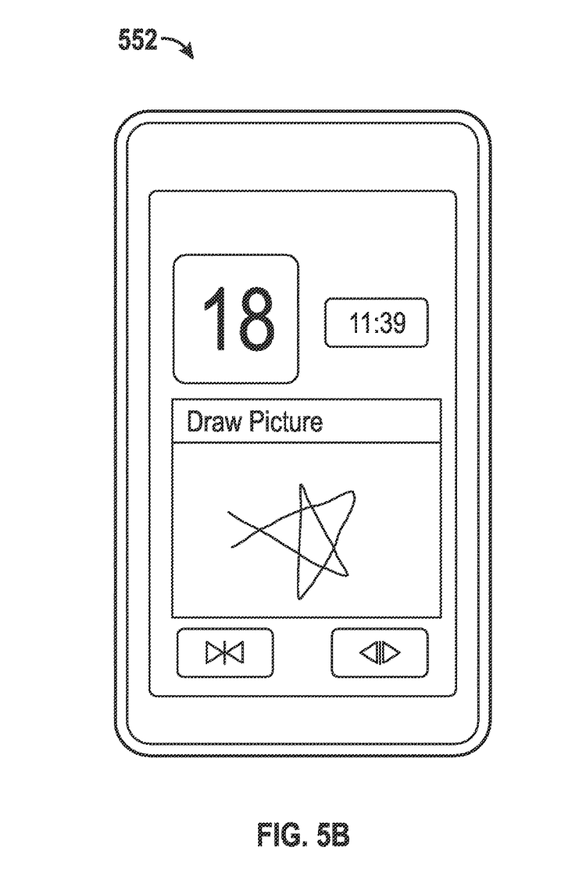
FIG. 5B is an exemplary touch screen for receiving an access credential as a picture or pattern.

In some embodiments, an access credential may include one or more other forms. For example, in connection with FIG. 5A a potential passenger may be requested to draw or enter a picture or pattern (e.g., a 'Z' shape) in a region of a message 502 displayed on the touchscreen 200. FIG. 5B illustrates a handwriting picture/pattern 552 (e.g., a 'star' shape) that may be entered. The entered picture/pattern may be compared to a stored picture/pattern to determine whether access rights to, e.g., floor number twenty-five should be granted. Much like the use of a signature in connection with FIG. 4, the comparison associated with FIGS. 5A-5B may be based on one or more thresholds.

Figure 6:
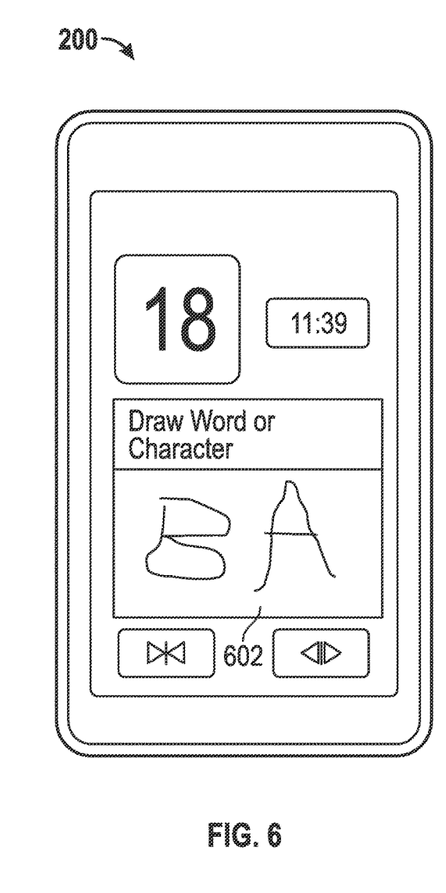
FIG. 6 is an exemplary touch screen for receiving an access credential as a word or character.

In FIG. 6, the passenger may be requested to enter a word or sequence of characters in a region of a message 602 displayed on the touchscreen. The entered word/sequence of characters may be compared to a stored word/sequence of characters to determine whether access to floor number twenty-five should be granted. Much like the use of a signature in connection with FIG. 4, the comparison associated with FIG. 6 may be based on one or more thresholds.

Figure 7:
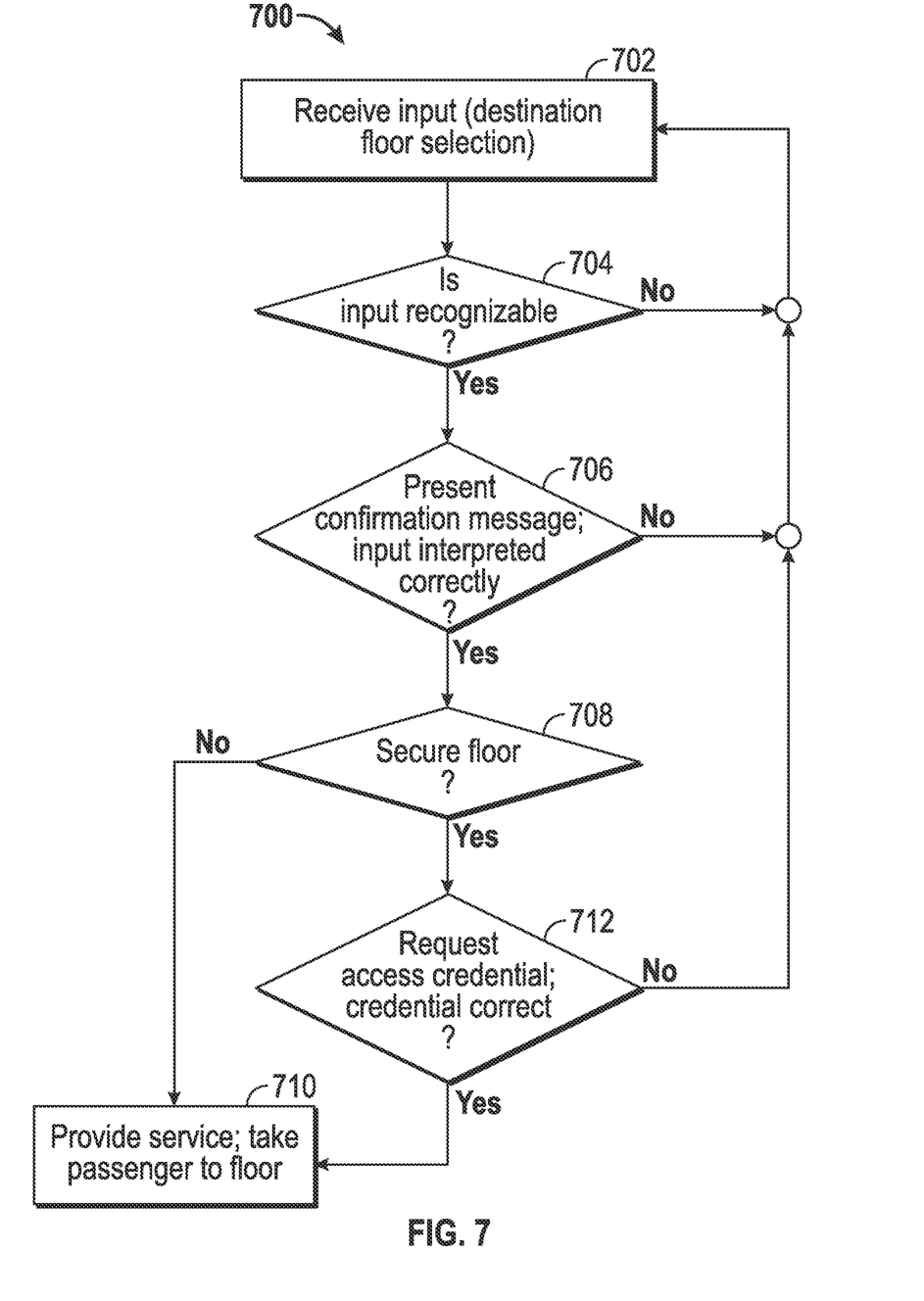
FIG. 7 illustrates a flow chart of an exemplary method.

Turning now to FIG. 7, a flow chart of an exemplary method 700 is shown. The method 700 may be executed by one or more systems, components, or devices, such as those described herein (e.g., the system 100). The method 700 may be used to provide elevator service to a passenger with respect to one or more destination floors or landings.

In block 702, one or more inputs may be received. The input may be received by one or more devices. For example, the input may be received by a hall or car operation panel, a destination input device, or a user device associated with a potential passenger of an elevator system. The input may include handwriting entered on a touchscreen (e.g., touchscreen 200). The input may (attempt to) select a destination floor.

In block 704, a determination may be made whether the input of block 704 is recognizable. As part of block 704, the input of block 702 may be compared to one or more stored versions of the input to determine whether the input of block 702 is within a threshold of the stored version(s) of the input.

If the input is recognizable (e.g., the input of block 702 is within the threshold of the stored version of the input), flow may proceed from block 704 to block 706. Otherwise, if the input is not recognizable (e.g., the input of block 702 is different from the stored version in an amount greater than the threshold), flow may proceed from block 704 to block 702.

In block 706, a confirmation message (e.g., message 302) may be presented for the passenger to confirm that the input of block 702 has been correctly interpreted/recognized in block 704. If the input was interpreted correctly, then flow may proceed from block 706 to block 708. Otherwise, if the input was interpreted incorrectly, flow may proceed from block 706 to block 702.

In block 708, a determination may be made whether the selected floor is a secure floor. If the selected floor is not a secure floor, flow may proceed from block 708 to block 710. If the selected floor is a secure floor, flow may proceed from block 708 to block 712.

In block 710, elevator service may be provided to the passenger. The elevator may take the passenger to the selected destination floor.

In block 712, one or more messages (e.g., messages 402, 502, 602) may be presented requesting the passenger to provide one or more access credentials. As part of block 712, input may be received pertaining to the access credentials. As part of block 712, a determination may be made whether the entered access credential corresponds to a stored access credential, potentially as a function of one or more thresholds. If the entered access credential corresponds to the stored access credential, flow may proceed from block 712 to block 710. Otherwise, if the entered access credential does not correspond to the stored access credential, flow may proceed from block 712 to block 702.

In some embodiments, if, in block 712, an entered access credential does not correspond to a stored access credential, flow may remain in block 712 to allow the passenger to "retry" entering the access credential. In such embodiments, a retry counter may be implemented to only allow the passenger to attempt re-entry of the access credential a number of times before access might be prohibited.

The method 700 is illustrative. In some embodiments, one or more of the blocks or operations (or a portion thereof) may be optional. In some embodiments additional blocks or operations not shown may be included. In some embodiments, the blocks or operations (or a portion thereof) may execute in an order or sequence that is different from what is shown in FIG. 7.

As described herein, a passenger may enter handwriting on a touchscreen to select a destination floor for an elevator. Handwriting may be used to avoid a need for the passenger to: (a) scroll through a listing of candidate destination floors, or (b) select the destination floor from a single display screen, both of which can be difficult and time-consuming when the number of candidate destination floors is large. Embodiments may reduce the probability or likelihood of the passenger incorrectly entering a destination floor. Embodiments may make more efficient use of the space or real estate available on the touchscreen, which can result in a smaller form factor being used for the touchscreen or display device. Embodiments may be used to enhance or improve the security associated with a resource (e.g., a particular floor in a building), as verification of picture, pattern, and/or handwriting (e.g., signature, word, or character) inputs may be a robust solution for confirming that a particular passenger should be granted access to the resource.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A method comprising:
   receiving, by a computing device comprising a processor, a handwriting input comprising a selection of a destination floor associated with an elevator system;
   determining, by the computing device, that the handwriting input selection is recognizable;
   presenting, by the computing device, a message that requests confirmation that the input selection is interpreted correctly based on determining that the handwriting input selection is recognizable;
   receiving, by the computing device, a response to the message that confirms the input selection; and
   causing, by the computing device, the elevator system to provide access to the destination floor based on the response.

2. The method of claim 1, further comprising:
   receiving, by the computing device, an entered access credential; and
   determining, by the computing device, that the entered access credential corresponds to a stored access credential within a threshold,
   wherein the elevator system provides access to the destination floor based on determining that the entered access credential corresponds to the stored access credential within the threshold.

3. The method of claim 2, wherein the access credential comprises at least one of: a signature, a picture, a pattern, a word, at least one character, and a handwriting picture.

4. The method of claim 1, further comprising:
   receiving, by the computing device, an entered access credential;
   determining, by the computing device, that the entered access credential does not correspond to a stored access credential within a threshold;

receiving, by the computing device, a second entered access credential based on determining that the entered access credential does not correspond to the stored access credential within the threshold; and determining, by the computing device, that the second entered access credential corresponds to the stored access credential within the threshold, wherein the elevator system provides access to the destination floor based on determining that the second entered access credential corresponds to the stored access credential within the threshold.

5. The method of claim 1, further comprising:

comparing, by the computing device, the handwriting input selection to a stored handwriting input selection; and determining, by the computing device, that the handwriting input selection matches the stored handwriting input selection within a threshold based on the comparison, wherein the determining that the handwriting input selection is recognizable is based on determining that the handwriting input selection matches the stored handwriting input selection within the threshold.

6. The method of claim 1, wherein the computing device comprises at least one of a hall operation panel, a car operation panel, a destination input device, and a user device associated with a passenger of the elevator system.

7. The method of claim 1, further comprising:

receiving, by the computing device, a second handwriting input comprising a selection of a second destination floor associated with the elevator system;

determining, by the computing device, that the second handwriting input selection is at least one of: not recognizable and requests access to a floor that is not present in a building associated with the elevator system; and generating, by the computing device, a message that requests re-entry of the second handwriting input based on determining that the second handwriting input selection is at least one of: not recognizable and requests access to the floor that is not present in the building.

8. An apparatus comprising:

at least one processor; and memory having instructions stored thereon that, when executed by the at least one processor, cause the apparatus to:

receive a handwriting input comprising a selection of a destination floor associated with an elevator system;

determine that the handwriting input selection is recognizable;

present a message that requests confirmation that the input selection is interpreted correctly based on determining that the handwriting input selection is recognizable;

receive a response to the message that confirms the input selection; and cause the elevator system to provide access to the destination floor based on the response.

9. The apparatus of claim 8, wherein the instructions, when executed, cause the apparatus to:

receive an entered access credential; and determine that the entered access credential corresponds to a stored access credential within a threshold, wherein the apparatus is configured to cause the elevator system to provide access to the destination floor based on determining that the entered access credential corresponds to the stored access credential within the threshold.

10. The apparatus of claim 9, wherein the access credential comprises at least one of: a signature, a picture, a pattern, a word, at least one character, and a handwriting picture.

11. The apparatus of claim 8, wherein the instructions, when executed, cause the apparatus to:

receive an entered access credential;

determine that the entered access credential does not correspond to a stored access credential within a threshold;

determine that a retry counter does not exceed a second threshold based on determining that the entered access credential does not correspond to the stored access credential within the threshold;

receive a second entered access credential based on determining that the retry counter does not exceed the second threshold; and determine that the second entered access credential corresponds to the stored access credential within the threshold, wherein the apparatus is configured to cause the elevator system to provide access to the destination floor based on determining that the second entered access credential corresponds to the stored access credential within the threshold.

12. The apparatus of claim 8, wherein the instructions, when executed, cause the apparatus to:

compare the handwriting input selection to a stored handwriting input selection; and determine that the handwriting input selection matches the stored handwriting input selection within a threshold based on the comparison, wherein the apparatus is configured to determine that the handwriting input selection is recognizable based on determining that the handwriting input selection matches the stored handwriting input selection within the threshold.

13. The apparatus of claim 8, wherein the computing device comprises at least one of a hail operation panel, a car operation panel, a destination input device, and a user device associated with a passenger of the elevator system.

14. A system comprising:

an elevator configured to convey passengers to a plurality of floors within a building, wherein at least one of the floors is a secured floor; and a processing device configured to:

receive a handwriting input comprising a selection of a destination floor included in the plurality of floors;

determine that the handwriting input selection is recognizable;

present a message that requests confirmation that the input selection is interpreted correctly based on determining that the handwriting input selection is recognizable;

receive a response to the message that confirms the input selection;

determine that the handwriting input selection corresponds to a secured floor based on the received response;

request an access credential based on determining that the handwriting input selection corresponds to a secured floor;

receive an access credential based on the request for the access credential;

determine that the received access credential matches a stored access credential within a threshold; and cause the elevator to provide access to the destination floor based on determining that the received access credential matches the stored access credential within the threshold.

15. The system of claim 14, wherein the processing device is configured to receive the access credential as a handwritten signature.

* * * * *